United States Patent
Kanamori

(10) Patent No.: US 7,456,597 B2
(45) Date of Patent: Nov. 25, 2008

(54) METHOD OF DRIVING FAN MOTOR

(75) Inventor: Atsushi Kanamori, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 11/700,939

(22) Filed: Feb. 1, 2007

(65) Prior Publication Data

US 2007/0216345 A1 Sep. 20, 2007

(30) Foreign Application Priority Data

Mar. 14, 2006 (JP) ............................. 2006-069176

(51) Int. Cl.
G05B 11/28 (2006.01)

(52) U.S. Cl. ................. 318/599; 318/811; 388/800; 388/819

(58) Field of Classification Search ................. 318/599, 318/811, 632, 727, 801; 388/800, 811, 819
See application file for complete search history.

(56) References Cited

U.S. PATENT DOCUMENTS 5,300,866 A * 4/1994 Yasohara et al. ....... 318/400.21

| | | | |
|---|---|---|---|
| 6,850,031 B2 * | 2/2005 | Nakata et al. | 318/801 |
| 6,873,125 B2 | 3/2005 | Seima et al. | |
| 2004/0189221 A1 * | 9/2004 | Kurosawa et al. | 318/254 |

FOREIGN PATENT DOCUMENTS

| JP | A-2002-142494 | 5/2002 |
|---|---|---|
| JP | A-2003-154952 | 5/2003 |
| JP | A-2004-268789 | 9/2004 |

* cited by examiner

*Primary Examiner*—Rina I Duda
(74) *Attorney, Agent, or Firm*—Posz Law Group, PLC

(57) ABSTRACT

A fan motor is driven under a pulse width modulation (PWM) control. PWM signals to be supplied to a circuit for driving the fan motor are formed from carrier waves having a specified frequency and a duty ratio of the PWM control. Rotational speed of the fan motor is increased by increasing the duty ratio. In a low speed region, the fan motor is driven with a high carrier frequency to suppress driving noises of the fan motor, while it is driven with a low carrier frequency in a high speed region to reduce switching losses in semiconductor elements. The carrier frequency may be continuously decreased when the fan motor speed reaches the high speed region, or it may be stepwise decreased. The low carrier frequency used in the high speed region is set to such a frequency that guarantees a sufficient number of switching times at a maximum speed of the fan motor.

5 Claims, 9 Drawing Sheets

METHOD OF DRIVING FAN MOTOR

CROSS-REFERENCE TO RELATED APPLICATION

This application is based upon and claims benefit of priority of Japanese Patent Application No. 2006-69176 filed on Mar. 14, 2006, the content of which is incorporated herein by reference.

BACKGROUND OF THE INVENTION

1. Field of the Invention

The present invention relates to a method of driving a fan motor.

2. Description of Related Art

In a PWM (Pulse Width Modulation) control for controlling operation of a fan motor for driving a fan, a carrier frequency used in the PWM control is often set to a frequency in a neighborhood of 20 kHz that is a little beyond an audible limit of human ears in order to reduce driving noises. However, a switching loss in semiconductor elements used in the PWM control device increases according to increase in the carrier frequency. Accordingly, it is necessary to use large size semiconductors or to use a large heat dissipation member.

On the other hand, JP-A-2002-142494 proposes to use a carrier having a very low frequency lower than several-tens Hz to reduce the switching loss in the semiconductor elements. In this case, however, another problem occurs. That is, the driving noises (vibration noises) become high in a low speed region where the wind noises of the fan are not high, although the driving noises are not noticeable in a high speed region where the wind noises are predominant.

It is also proposed to terminate the PWM control in a high speed region where the duty ratio in the PWM control reaches 80% to reduce the switching loss in a system using a high carrier frequency such as 20 kHz. The duty ratio is brought to 100% where no switching loss occurs to drive the fan motor at its maximum speed. In this case, however, the duty ratio is changed stepwise from 80% to 100%, and noises or vibrations due to an abrupt speed change are generated. Further, a rush current may flow at the abrupt change of the duty ratio.

SUMMARY OF THE INVENTION

The present invention has been made in view of the above-mentioned problem, and an object of the present invention is to provide an improved method of driving a fan motor and to provide an improved apparatus for driving the fan motor, in which the switching losses are reduced while suppressing the driving noises.

A fan such as a cooling fan for cooling a radiator mounted on an automotive vehicle is driven by a fan motor under a pulse width modulation (PWM) control. PWM signals to be supplied to a circuit for driving the fan motor is formed from carrier waves having a specified frequency and a duty ratio in the PWM control. Rotational speed of the fan motor is controlled according to the duty ratio, i.e., it is increased by increasing the duty ratio.

In the PWM control, switching losses in semiconductor elements such as MOSFETs become high when the carrier frequency is high, while driving noises of the fan motor become high in a low speed region when the carrier frequency is low. To cope with this problem, the fan motor is driven with a high carrier frequency (e.g., 20 kHz) until the rotational speed of the fan motor reaches a marginal speed Nm, at which wind noises of the fan become predominant over the driving noises. After the fan motor speed exceeds the marginal speed, the fan motor is driven with a low carrier frequency (e.g., 10 kHz). That is, the carrier frequency is switched to a higher frequency when the fan motor reaches the marginal speed Nm.

The carrier frequency may be stepwise decreased to a lower frequency when the fan motor speed reaches the marginal speed. Alternatively, the carrier frequency may be linearly and continuously decreased. Preferably, the duty ratio corresponding to the marginal speed is set when a load of the fan motor deviates to the highest level. In this manner, the driving noises are surely suppressed. The low carrier frequency, with which the fan motor is driven when the motor speed reaches the marginal speed, is set to such a frequency that secures a sufficient number of switching times at a maximum speed of the fan motor.

According to the present invention, the driving noises of the fan motor are suppressed in a low speed region while reducing switching losses in the semiconductor elements in a high speed region. Other objects and features of the present invention will become more readily apparent from a better understanding of the preferred embodiments described below with reference to the following drawings.

DETAILED DESCRIPTION OF THE PREFERRED EMBODIMENTS

Figure 1:
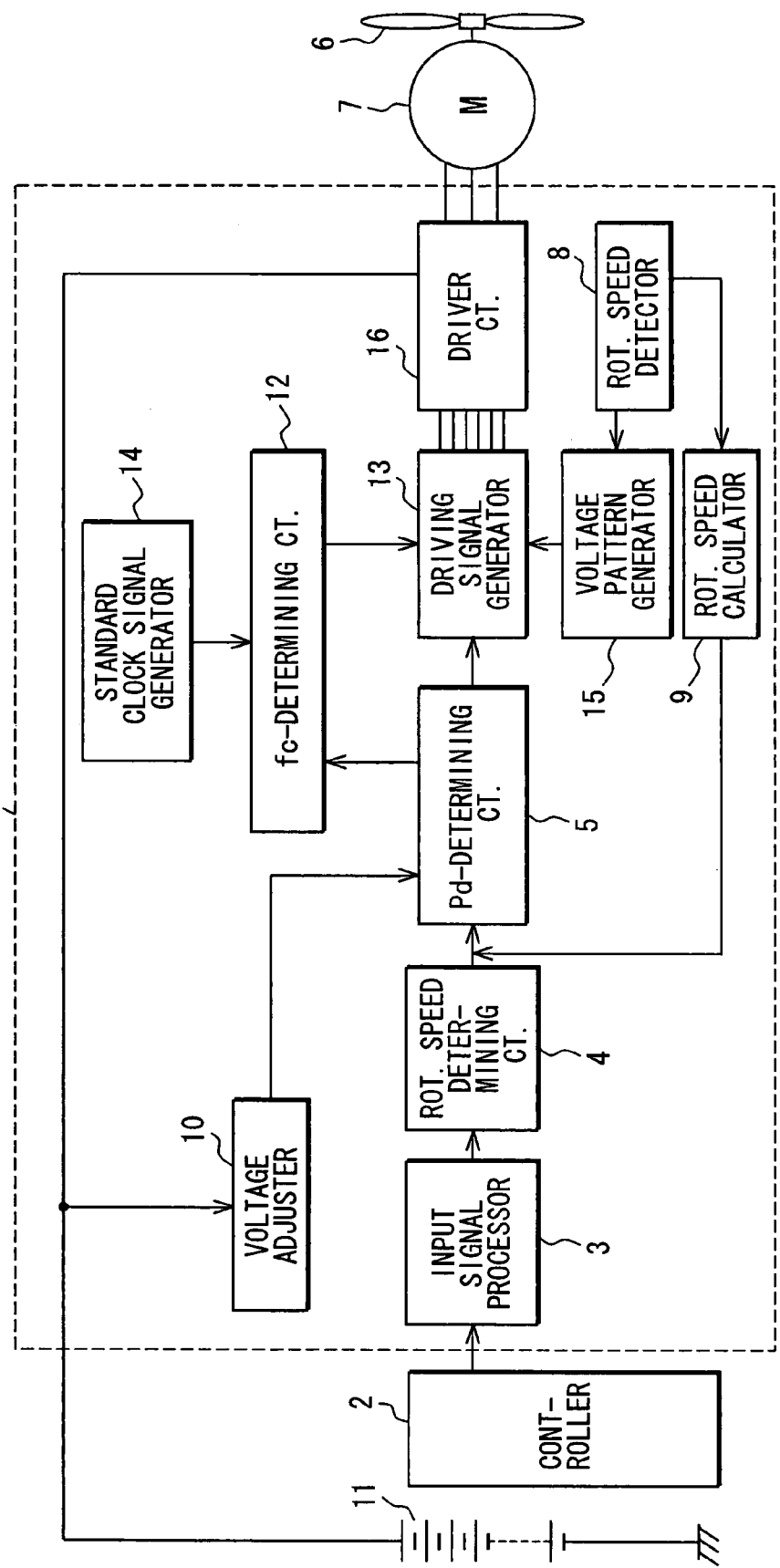
FIG. 1 is a block diagram showing an entire structure of an apparatus for driving a fan motor, as a first embodiment of the present invention.

A first embodiment of the present invention will be described with reference to FIGS. 1-8. First, referring to FIG. 1, an entire structure of a fan motor driving apparatus will be described. The driving apparatus 1 is powered by a battery 11, and supplies power to a three-phase brushless DC motor 7 that drives a fan 6. A controller 2 such as an electronic control unit (ECU) feeds a speed command (a command as to rotational speed of the motor 7) to an input signal processor 3 in the driving apparatus 1 as a PWM (Pulse Width Modulation) signal. The input signal processor 3 converts a duty ratio Rd included in the PWM signal into a duty ratio voltage Vd that represents the duty ratio Rd. The duty ratio voltage Vd is fed to a rotational speed determining circuit 4. The controller 2 outputs the speed command based on a signal, such as a water temperature in a radiator fed from a temperature sensor.

The rotational speed determining circuit 4 determines a rotational speed signal based on the duty ratio voltage Vd and outputs Vd to a circuit 5 for determining an output duty Pd. The fan 6 is driven by the three-phase brushless DC motor 7. The rotational speed of the motor 7 is detected by a rotational speed detector 8 which is constituted by a sensor such as a Hall IC (integrated circuit), a resolver or a rotary encoder. Alternatively, the rotational speed of the motor 7 may be detected based on a voltage waveform induced in windings of the motor 7 without using a separate speed detector.

The output signal of the rotational speed detector 8 (e.g., a signal representing a angular position of a rotor) is fed to a rotational speed calculator 9 that calculates an actual rotational speed N of the motor 7. The rotational speed N is fed to the output duty-determining circuit 5 that determines the output duty Pd based on a difference between the rotational speed N and a rotational speed command fed from the rotational speed determining circuit 4. The output duty Pd determined in the Pd-determining circuit 5 is adjusted based on an adjusting command fed from a voltage adjuster 10 that monitors a voltage of the battery 11. Namely, the output duty Pd is adjusted according to the battery voltage.

The output duty Pd determined by the Pd-determining circuit 5 is fed to a carrier frequency determining circuit (fc-determining circuit) 12 and a driving signal generator 13. The fc-determining circuit 12 generates a carrier having a carrier frequency fc to be used in the PWM control based on a standard clock signal fed from the standard clock signal generator 14. The carrier frequency fc is changed according to the output duty Pd in a manner explained later in detail.

Figure 8:
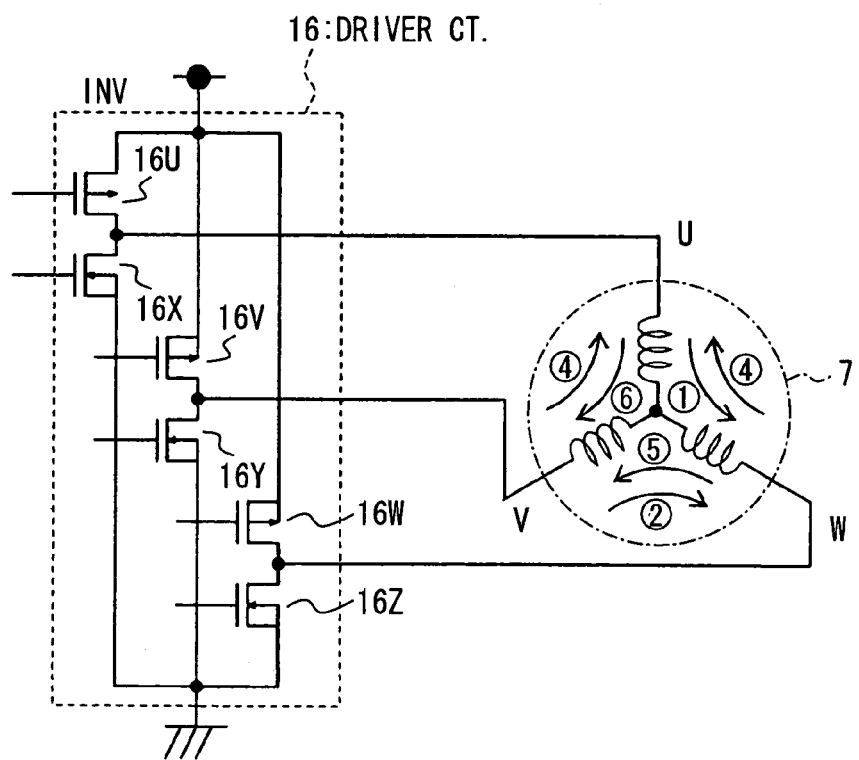
FIG. 8 is a circuit diagram showing an inverter in a driving circuit connected to phase windings of the fan motor.

The output signal of the rotational speed detector 8 is also fed to a voltage pattern generator 15 that generates voltage patterns according to the rotor positions indicated by the output signal of the rotational speed detector 8. The voltage patterns are fed to a driving signal generator 13. The driving signal generator 13 generates PWM signals (refer to FIG. 2) based on the voltage patterns fed from the voltage pattern generator 15, the carrier fed from the fc-determining circuit 12 and the output duty Pd fed from the Pd-determining circuit 5. The PWM signals are supplied to a driver circuit 16. The driver circuit 16 is a three-phase inverter bridge circuit, as shown in FIG. 8, constituted by six power MOSFETs (semiconductor elements) 16U, 16V, 16W, 16X, 16Y and 16Z. The PWM signals generated in the driving signal generator 13 are fed to gates of the respective MOSFETs 16U-16Z.

Figure 3:
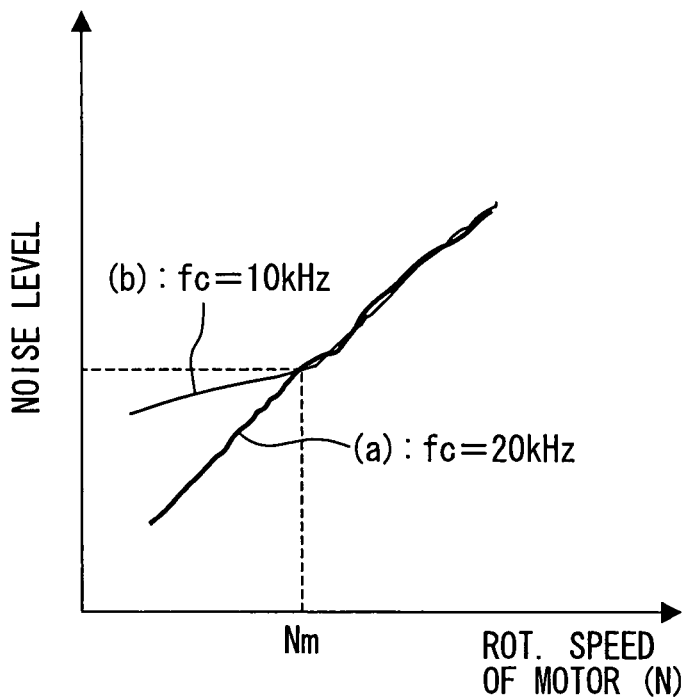
FIG. 3 is a graph showing levels of driving noises and wind noises relative to a rotational speed of the fan motor.

Now, a method and a structure for reducing noises and switching losses in the first embodiment described above will be explained. Noise levels of the motor 7 and the fan 6 that change according to the rotational speed N are shown in FIG. 3. Graph (a) shows overall noises (driving noises of the motor 7 and wind noises of the fan 6) when the motor 7 is driven under PWM control with a carrier frequency of 20 kHz. The rotational speed N is increased by increasing the output duty Pd. In this case, the overall noises linearly increase according to the rotational speed N because the wind noises of the fan 6 are predominant. Graph (b) shows overall noises when the motor 7 is driven under PWM control with a carrier frequency of 10 kHz. In this case, the noise level (b) becomes higher than (a) in a speed region lower than a marginal speed Nm because the driving noises are high in the low speed region when the motor 7 is driven with a low carrier frequency. But, in the high speed region (higher than Nm), the noise level (a) becomes nearly equal to (b) because the wind noises become predominant in the high speed region.

Figure 4:
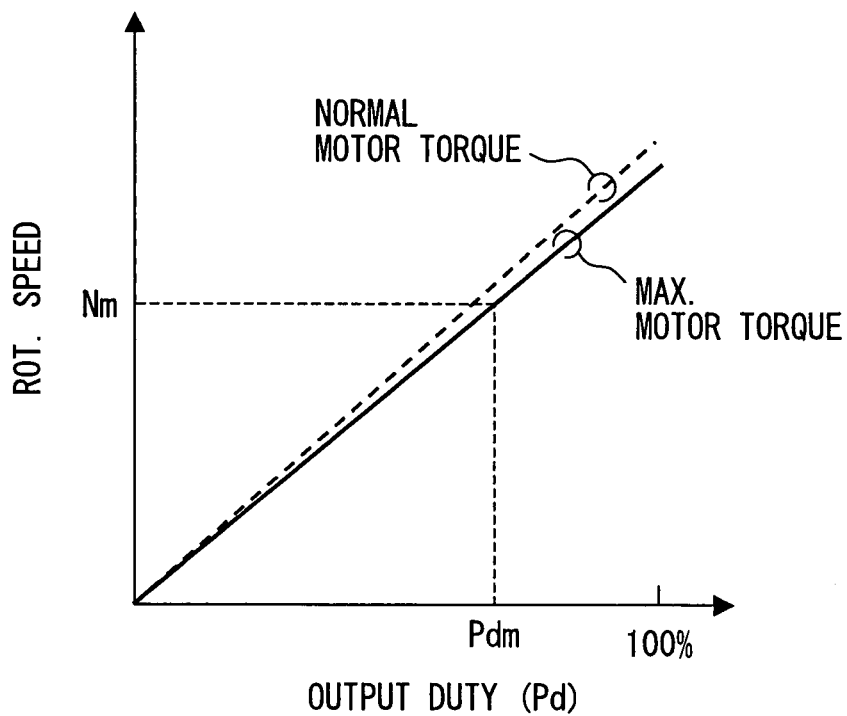
FIG. 4 is a graph showing a relation between a duty ratio in the PWM control and a rotational speed of the fan motor.
Figure 5:
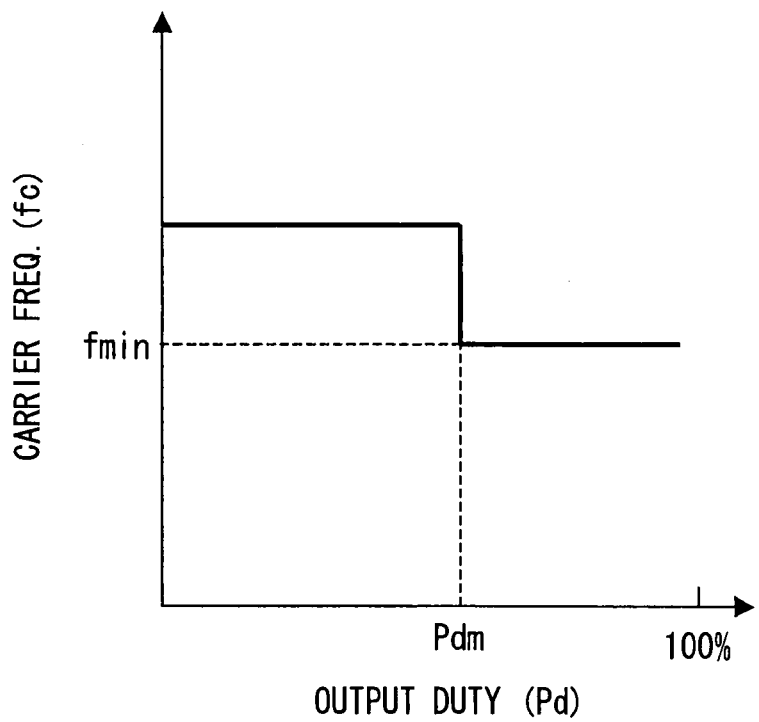
FIG. 5 is a graph showing a carrier frequency that is reduced stepwise when the duty ratio reaches a marginal duty ratio.

Considering the phenomenon described above, the motor 7 is driven under the PWM control with the carrier frequency of 20 kHz up to the marginal speed Nm, and the carrier frequency fc is decreased to fmin (for example, 10-12 kHz) after the rotational speed becomes higher than the marginal speed Nm. Since the rotational speed N is increased by increasing the output duty Pd, the carrier frequency fc is lowered to fmin when the output duty Pd reaches a marginal output duty Pdm that corresponds to the marginal speed Nm, as shown in FIG. 5. The output duty Pd corresponding to the rotational speed N deviates according to a motor load. Therefore, the marginal output duty Pdm is determined to correspond to the marginal speed Nm when the motor load is the highest, as shown in FIG. 4.

Figure 6:
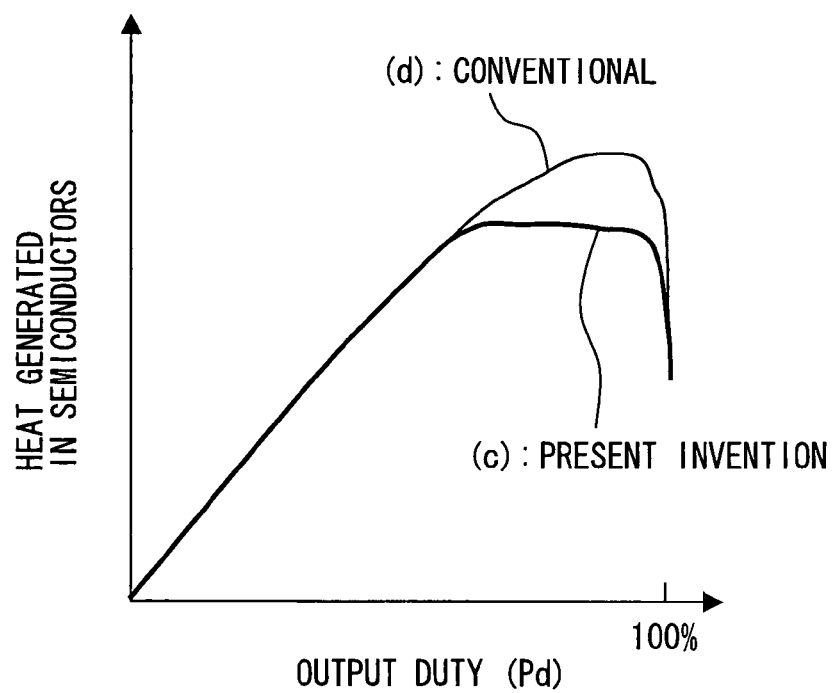
FIG. 6 is a graph showing an amount of heat generated in semiconductor elements, the amount of heat being compared between a conventional apparatus and an embodiment of the present invention.

The switching loss in the semiconductor elements becomes high as the carrier frequency becomes high. Therefore, it is advantageous to use a lower carrier frequency in the high speed region. FIG. 6 shows an amount of heat generated in the semiconductor elements relative to the rotational speed N, i.e., output duty Pd. Graph (d) in FIG. 6 shows an amount of heat generated in the semiconductor elements in a conventional apparatus, in which the motor is driven under the PWM control with a constant carrier frequency of 20 kHz. Graph (c) shows an amount of heat generated in the semiconductor elements in the first embodiment of the present invention in which the motor is driven by PWM with a 20 kHz carrier frequency up to the marginal output duty Pdm and with 10 kHz carrier frequency after the output duty Pd reaches the marginal output duty Pdm. As clear from the FIG. 6, the heat generated in the high speed region is considerably less in the embodiment of the present invention than in the conventional apparatus.

Figure 2:
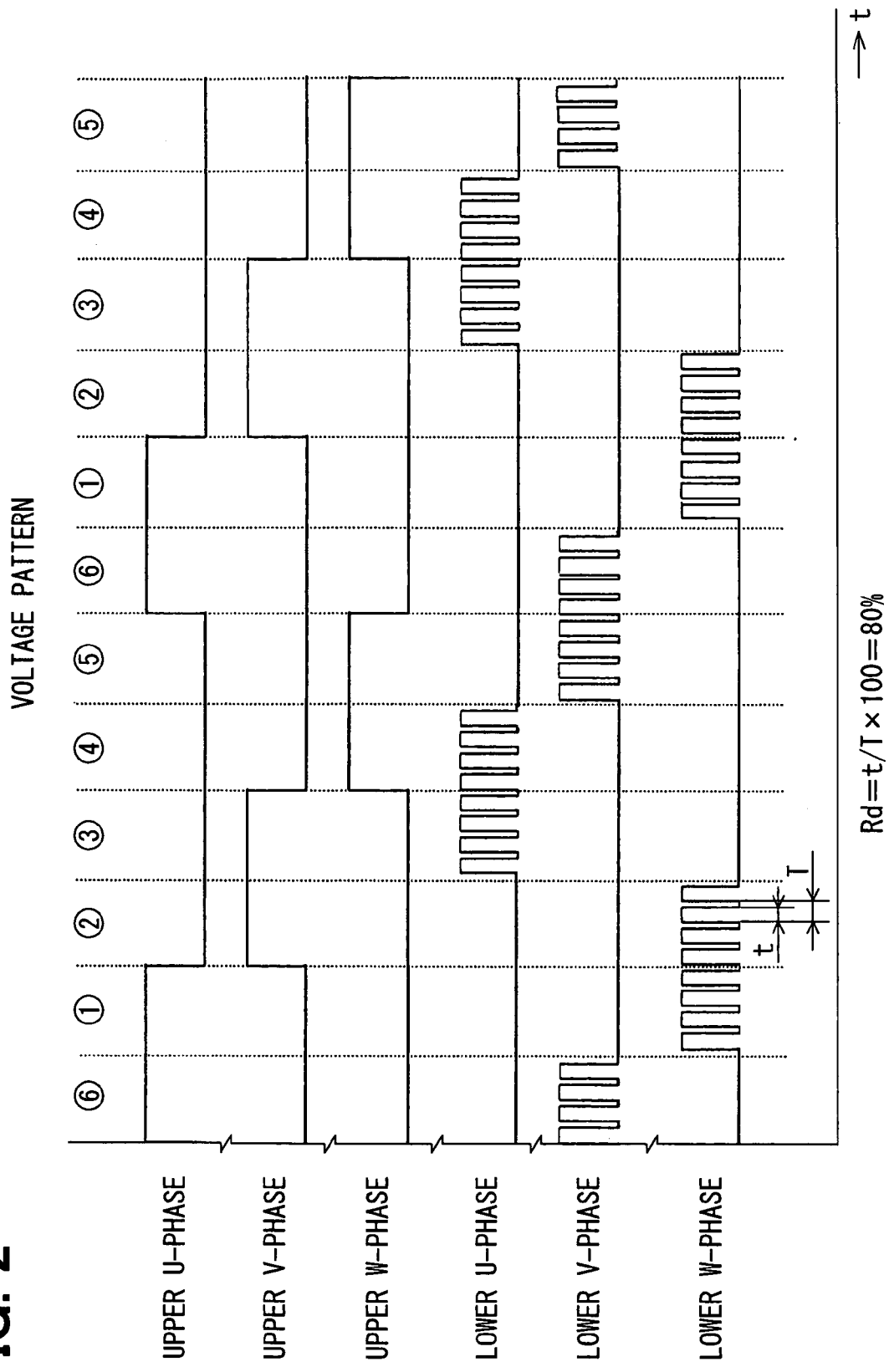
FIG. 2 is a graph showing voltage patterns supplied to phase windings of the fan motor.
Figure 7:
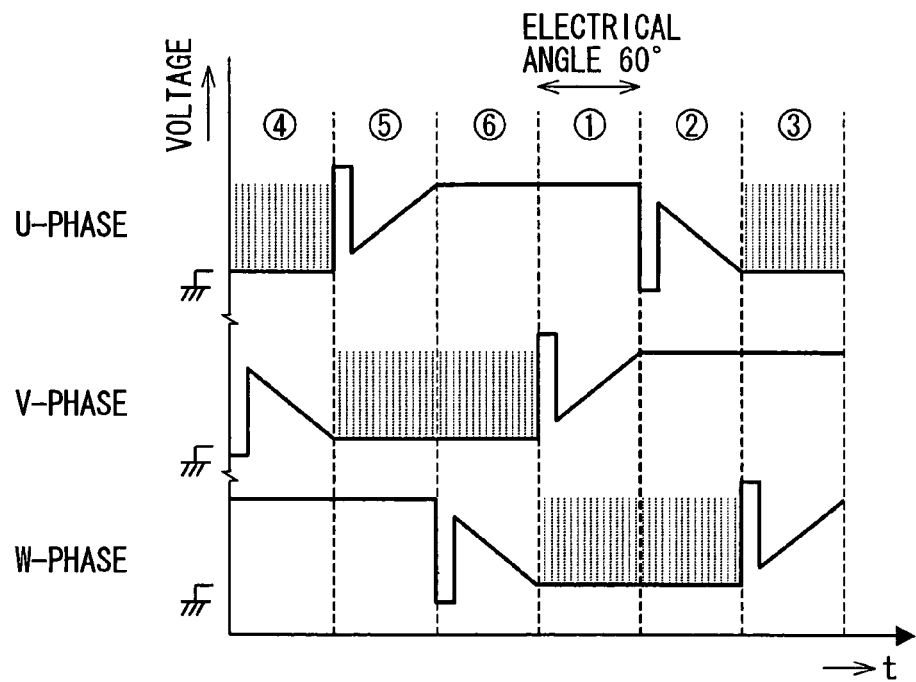
FIG. 7 is a graph showing voltage patterns supplied to phase windings, the voltage being supplied with an electrical angle of 120°.

Now, how the minimum carrier frequency fmin is set will be explained. When the motor 7 is driven with rectangular voltages having an electrical angle of 120° as shown in FIG. 2, phase voltages of each phase U, V, and W have voltage patterns which change every electrical angle of 60° (①-⑥), as shown in FIG. 7. In FIG. 8, the inverter circuit in the driving circuit 16 is shown, and directions of current in the phase windings corresponding to voltage patterns shown in FIG. 7 are also shown. A flywheel diode (now shown) is connected between each drain and source of the MOSFETs 16U-16Z.

The maximum rotational speed Rmax' of the motor 7 per second is: Rmax'=Rmax/60, where Rmax is the maximum speed per minute. Time T360 (second) corresponding to an electrical angle 360° equals to 1/Rmax'/Pn, where the number of pole pairs is Pn. Time T60 (second) corresponding to an electrical angle 60° equals to T360/6. That is, T60=T360/6=1/Rmax'/Pn/6=10/Rmax/Pn. Accordingly, the carrier frequency fmin is calculated in the following formula:

$$fmin = Nmin/T60 = Pn \cdot Rmax \cdot Nmin/10,$$

where Nmin is the number of switching times of PWM control to be performed in an electrical angle 60°. More particularly, fmin is calculated in the following formula:

$$fmin = 4 \times 3000 \times 10/10 = 12,000 \text{ Hz} = 12 \text{ kHz},$$

assuming that the number of pole pairs Pn of the three-phase brushless DC motor is 4, the maximum rotational speed is 3000 per minute and that switching is performed 10 times in an electrical angle 60°.

Advantages attained in the first embodiment described above can be summarized as below. The motor 7 is driven under the PWM control with a high carrier frequency in the low speed region. The carrier frequency is reduced to the minimum carrier frequency fmin when the rotational speed N of the motor 7 reaches the marginal rotational speed Nm (corresponding to the marginal output duty Pdm). In this manner, the switching loss in the semiconductor elements is reduced in the high speed region while suppressing the driving noises in the low speed region. The rotational speed of the motor 7 is smoothly and continuously changed by changing the duty ratio Rd in the PWM control. In addition, since the marginal output duty Rdm is set to a level corresponding to the marginal speed Nm that occurs when the motor load deviates to the maximum level, the carrier frequency fc can be switched to always realize the low switching noises. Further, since the minimum carrier frequency fmin is set to satisfy the above formula, the carrier frequency can be sufficiently lowered while securing a minimum switching times at the maximum rotational speed.

Figure 9:
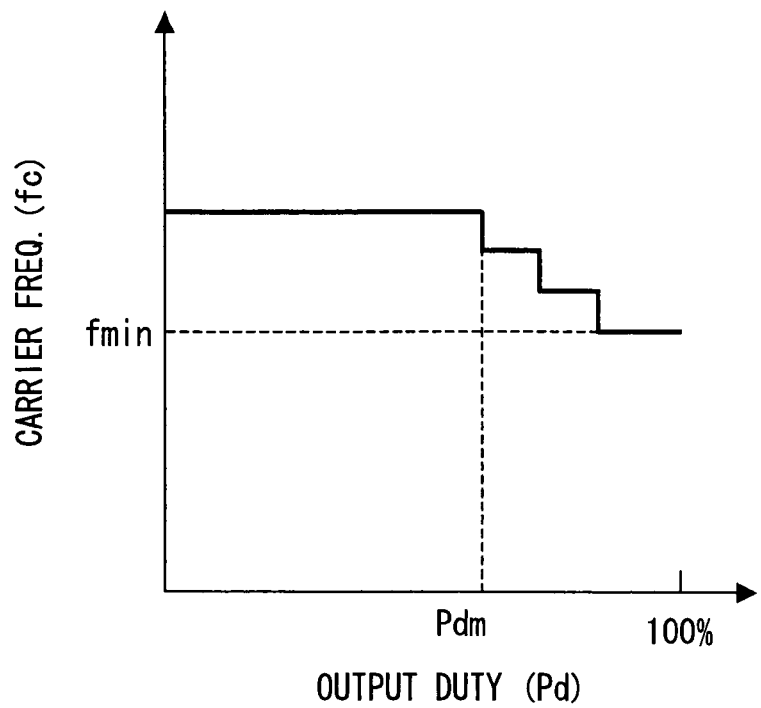
FIG. 9 is a graph showing a carrier frequency that is reduced in three steps when the duty ratio reaches the marginal duty ratio.
Figure 11:
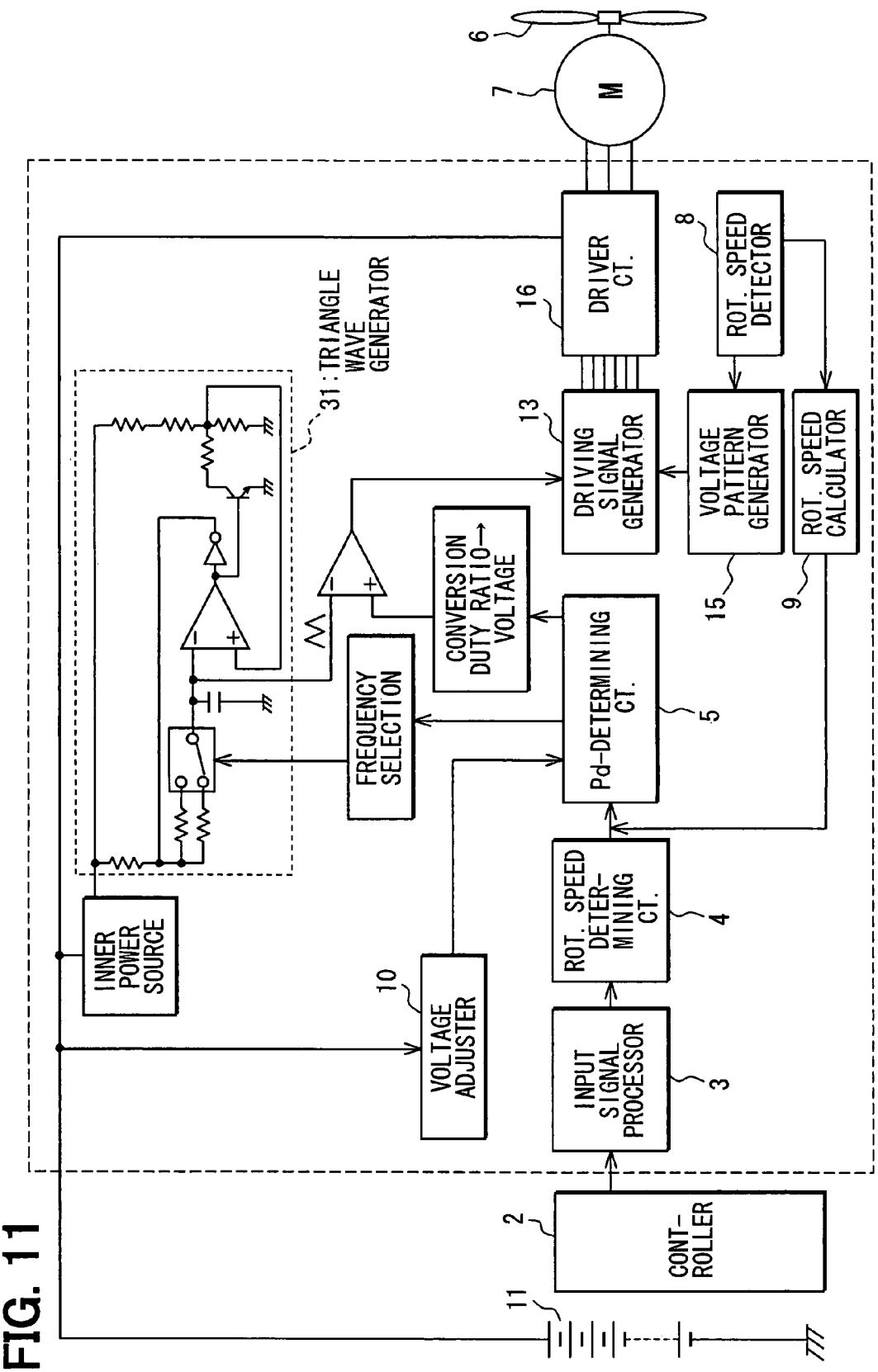
FIG. 11 is a block diagram showing an entire structure of an apparatus for driving a fan motor, as a second embodiment of the present invention.

A second embodiment of the present invention is shown in FIGS. 9 and 11. In the second embodiment, the carrier frequency is stepwise reduced to fmin after the rotational speed of the motor 7 has reached the marginal speed Nm (corresponding to the marginal output duty Pdm). FIG. 9 shows a case where the carrier frequency fc is reduced to fmin in three steps. The stepwise reduction of the carrier frequency is realized, for example, in a circuit shown in FIG. 11 (though the carrier frequency is reduced in two steps in this example). In the circuit shown in FIG. 11, the carrier frequency is switched by changing a time constant of CR in a triangle wave generator 31 according to the output duty Pd. Other structures and functions are the same as those in the first embodiment.

Figure 10:
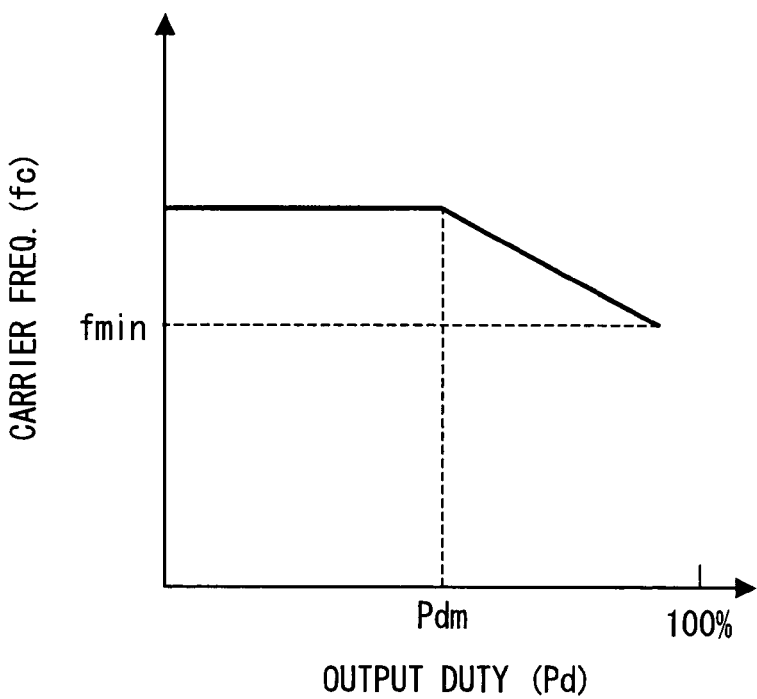
FIG. 10 is a graph showing a carrier frequency that is continuously and linearly reduced when the duty ratio reaches the marginal duty ratio.
Figure 12:
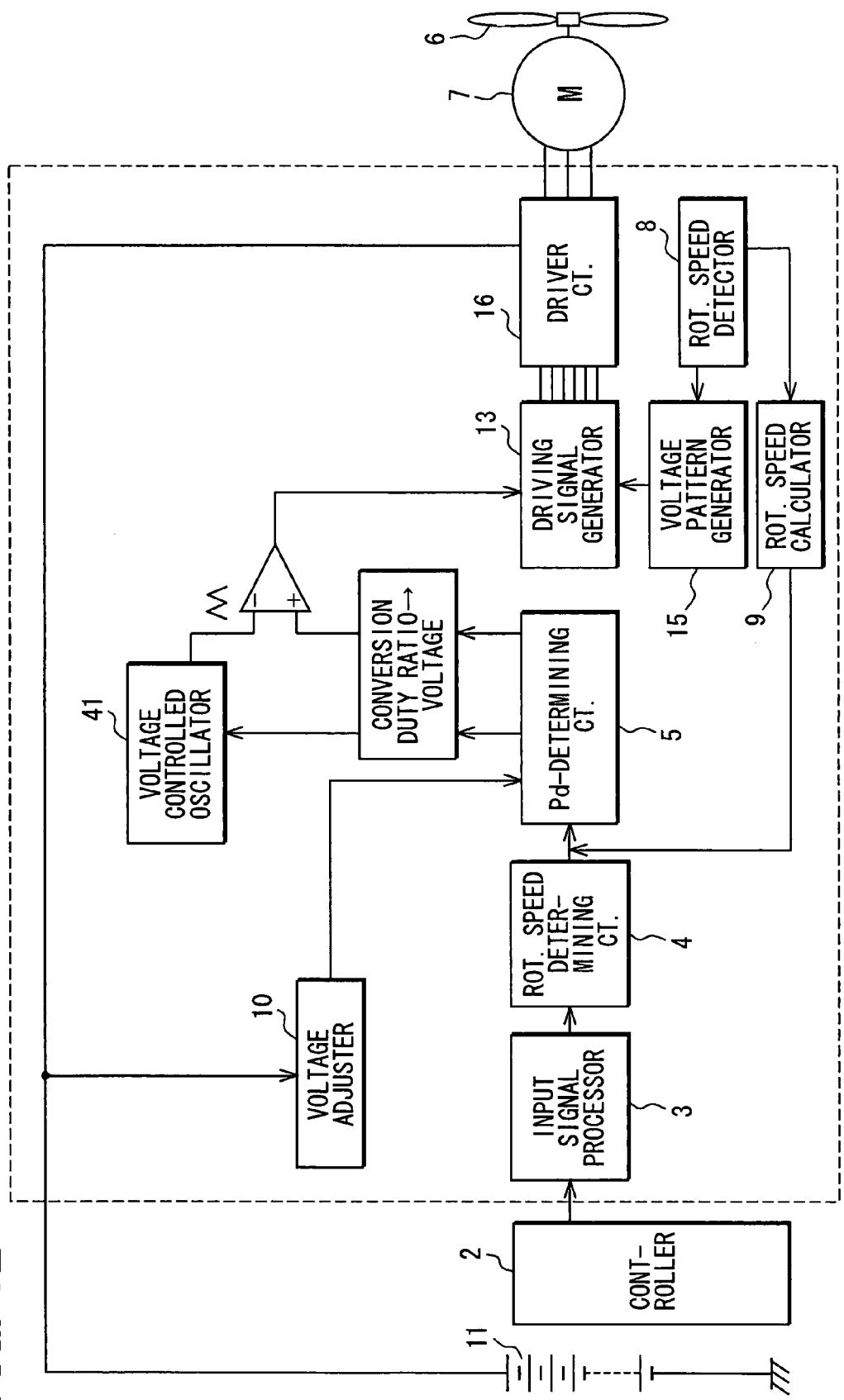
FIG. 12 is a block diagram showing an entire structure of an apparatus for driving a fan motor, as a third embodiment of the present invention.

A third embodiment of the present invention is shown in FIGS. 10 and 12. In the third embodiment, the carrier frequency is linearly and continuously reduced to the minimum carrier frequency fmin after the rotational speed N of the motor 7 has reached the marginal speed Nm (marginal output duty Pdm) FIG. 10 shows that the carrier frequency is linearly reduced to the minimum carrier frequency fmin after the output duty has reached the marginal output duty Pdm. The linear reduction of the carrier frequency can be realized, for example, in a circuit shown in FIG. 12. The carrier frequency is linearly changed by inputting analog voltage according to the output duty Pd to a voltage controlled oscillator 41. Other structures and functions are the same as those in the first embodiment. In the second and the third embodiments, the driving conditions of the motor 7 can be more smoothly changed.

Figure 13:
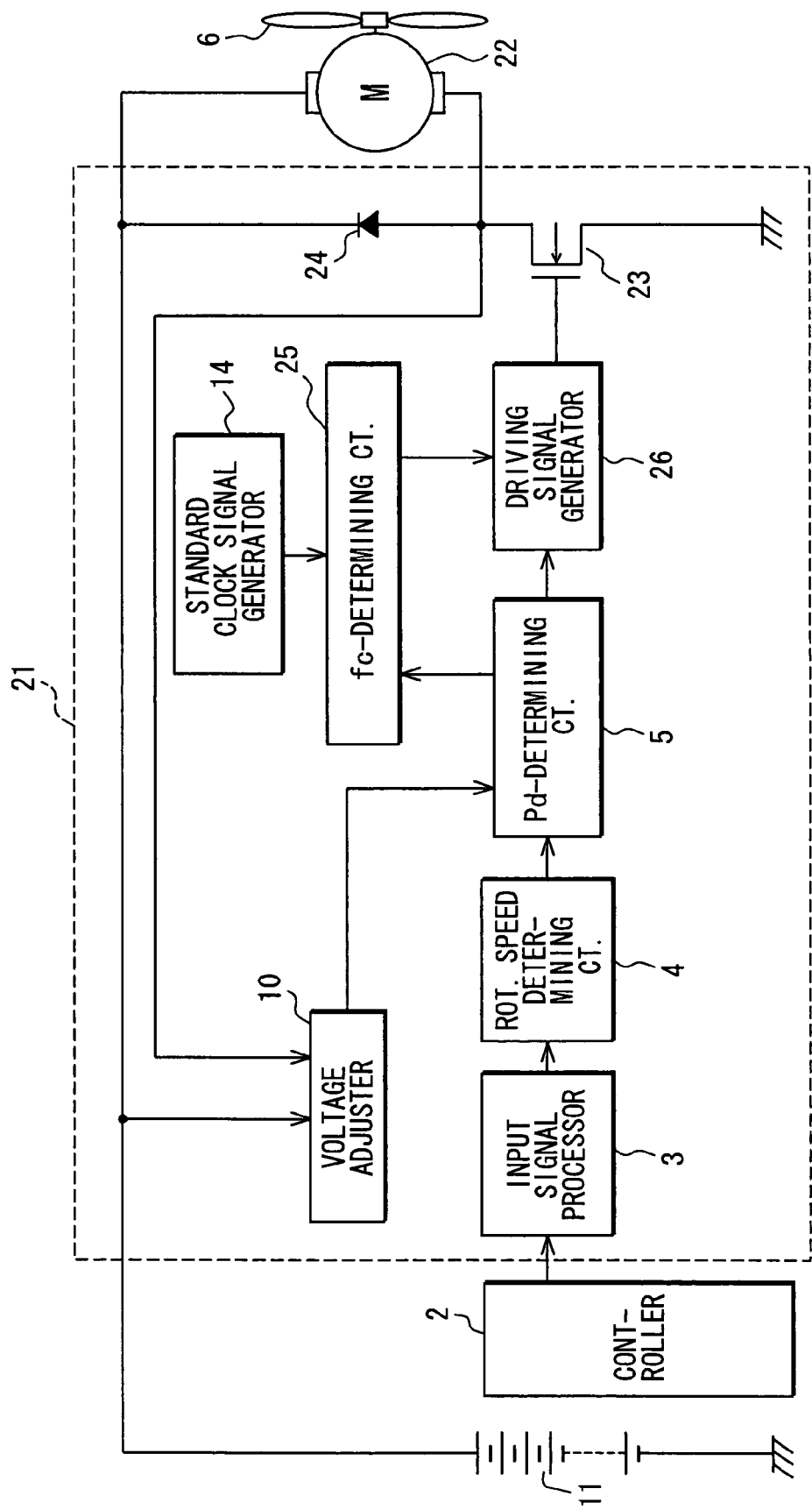
FIG. 13 is a block diagram showing an entire structure of an apparatus for driving a fan motor, as a fourth embodiment of the present invention.

A fourth embodiment of the present invention is shown in FIG. 13. In this embodiment, a low-side driven DC motor 22 is used in place of the three-phase brushless motor 7 in the first embodiment. That is, the DC motor 22 connected in series to an N-channel MOSFET 23 is connected across the battery 11. A flywheel diode 24 is connected in parallel to the DC motor 22. The rotational speed detector 8, the rotational speed calculator 9, the voltage pattern generator 15 and the driver circuit 16, all used in the first embodiment, are eliminated. The fc-determining circuit 12 used in the first embodiment is replaced with the fc-determining circuit 25 that generates carrier frequencies suitable to drive the DC motor 22. The driving signal generator 13 used in the first embodiment is replaced with a driving signal generator 26 that generates PWM signals to be fed to a gate of the MOSFET 23. The minimum carrier frequency fmin is set to, e.g., several-tens Hz in this embodiment (refer to JP-A-2002-142494 mentioned in the background section of this specification). Other structures are the same as those in the first embodiment, and the similar advantages are attained in this embodiment, too.

The present invention is not limited to the embodiments described above, but it may be variously modified. For example, the semiconductor elements used in the driving apparatus are not limited to FETs, but other devices such as power transistors or IGBTs may be used. The marginal output duty Pdm and the minimum carrier frequency fmin may be set to various levels according to individual design needs. In the case of a multi-phase motor having four phases or more, the minimum carrier frequency fmin can be determined in the manner similar to that in the first embodiment. In the fourth embodiment, the DC motor 22 may be high-side driven. Application of the driving apparatus of the present invention is not limited to the motor 7 for driving a cooling fan of a radiator mounted on a vehicle, but it may be applied to various motors that drive a fan.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of driving a fan motor under PWM control, using semiconductor elements, the method comprising:
    generating a voltage representing a duty ratio of the PWM control;
    generating carrier waves having a specified carrier frequency;
    forming PWM signals based on the carrier waves and the voltage representing the duty ratio; and
    supplying the PWM signals to the fan motor for driving a fan, wherein:
    rotational speed of the fan motor is controlled by changing the duty ratio of the PWM control; and
    the specified carrier frequency is reduced to a predetermined minimum frequency when the rotational speed of the fan motor has reached a marginal speed, at which wind noises of the fan become predominant over driving noises of the fan motor, to thereby reduce switching losses in the semiconductor elements.

2. The method of driving a fan motor as in claim 1, wherein:
    the specified carrier frequency is stepwise reduced to the predetermined minimum frequency.

3. The method of driving a fan motor as in claim 1, wherein:
    the specified carrier frequency is linearly reduced to the predetermined minimum frequency.

4. The method of driving a fan motor as in claim 1, wherein:
    the duty ratio that realizes the marginal speed when a torque required to drive the fan motor is deviated to the highest level is set to a marginal duty ratio; and
    the specified carrier frequency is reduced to the predetermined minimum frequency when the duty ratio reaches the marginal duty ratio.

5. The method of driving a fan motor as in claim 1, wherein:
    the minimum carrier frequency (fmin) is set according to the formula: fmin=Pn·Rmax·Nmin/10, where the fan motor is a three-phase motor, Pn is the number of pole pairs, Rmax is a maximum rotational speed of the fan motor per minute, and Nmin is the number of switching times performed in an electrical angle of 60°.

\* \* \* \* \*